US012602164B2

(12) United States Patent
Hegde et al.

(10) Patent No.: US 12,602,164 B2
(45) Date of Patent: Apr. 14, 2026

(54) DATA STORAGE DEVICE AND METHOD FOR THERMAL MANAGEMENT THROUGH COMMAND SELECTION

(71) Applicant: Sandisk Technologies, Inc., Milpitas, CA (US)

(72) Inventors: Roshini Hegde, Bangalore (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/676,911

(22) Filed: May 29, 2024

(65) Prior Publication Data

US 2025/0370622 A1     Dec. 4, 2025

(51) Int. Cl.
*G06F 3/06* (2006.01)

(52) U.S. Cl.
CPC .......... *G06F 3/0613* (2013.01); *G06F 3/0653* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,021,076 A | 2/2000 | Woo et al. | |
| 8,304,698 B1 | 11/2012 | Tischler | |
| 9,760,311 B1 | 9/2017 | Amir et al. | |
| 9,959,188 B1 * | 5/2018 | Krishnan | ............ G06F 9/45533 |
| 10,353,446 B2 | 7/2019 | Lovicott et al. | |
| 11,016,545 B2 | 5/2021 | Yang et al. | |
| 2012/0124590 A1 * | 5/2012 | Balakrishnan | ........ G06F 1/3275 |
| | | | 718/103 |
| 2014/0032939 A1 * | 1/2014 | Jeddeloh | ................ G11C 5/147 |
| | | | 713/300 |
| 2015/0338902 A1 * | 11/2015 | Mittal | .................... G06F 1/3234 |
| | | | 713/320 |
| 2016/0320971 A1 * | 11/2016 | Postavilsky | ........... G06F 3/0659 |
| 2017/0109205 A1 * | 4/2017 | Ahuja | .................... G06F 9/5094 |
| 2018/0260152 A1 * | 9/2018 | Bar | ....................... G06F 3/0688 |
| 2018/0286110 A1 * | 10/2018 | Doyle | ................... G06T 15/005 |
| 2019/0004723 A1 * | 1/2019 | Li | ........................... G06F 1/3296 |
| 2019/0073154 A1 * | 3/2019 | Gwin | ..................... G06F 3/0679 |
| 2023/0350696 A1 * | 11/2023 | Harwani | ................. G06F 1/206 |
| 2024/0232039 A1 * | 7/2024 | Isaac | ...................... G06N 20/00 |

\* cited by examiner

*Primary Examiner* — Jared I Rutz
*Assistant Examiner* — Alexander J Yoon
(74) *Attorney, Agent, or Firm* — Crowell & Moring LLP

(57)          ABSTRACT

A data storage device and method are disclosed for thermal management through command selection. In one embodiment, a data storage device is provided comprising a memory and one or more processors. The one or more processors, individually or in combination, are configured to: determine whether a temperature of the memory and/or a temperature of the one or more processors is above a threshold temperature; in response to determining that only the temperature of the memory is above the threshold temperature, execute a command whose execution uses relatively-more involvement of the one or more processors and relatively-less involvement of the memory; and in response to determining that only the temperature of the one or more processors is above the threshold temperature, execute a command whose execution uses relatively-more involvement of the memory and relatively-less involvement of the one or more processors. Other embodiments are provided.

19 Claims, 8 Drawing Sheets

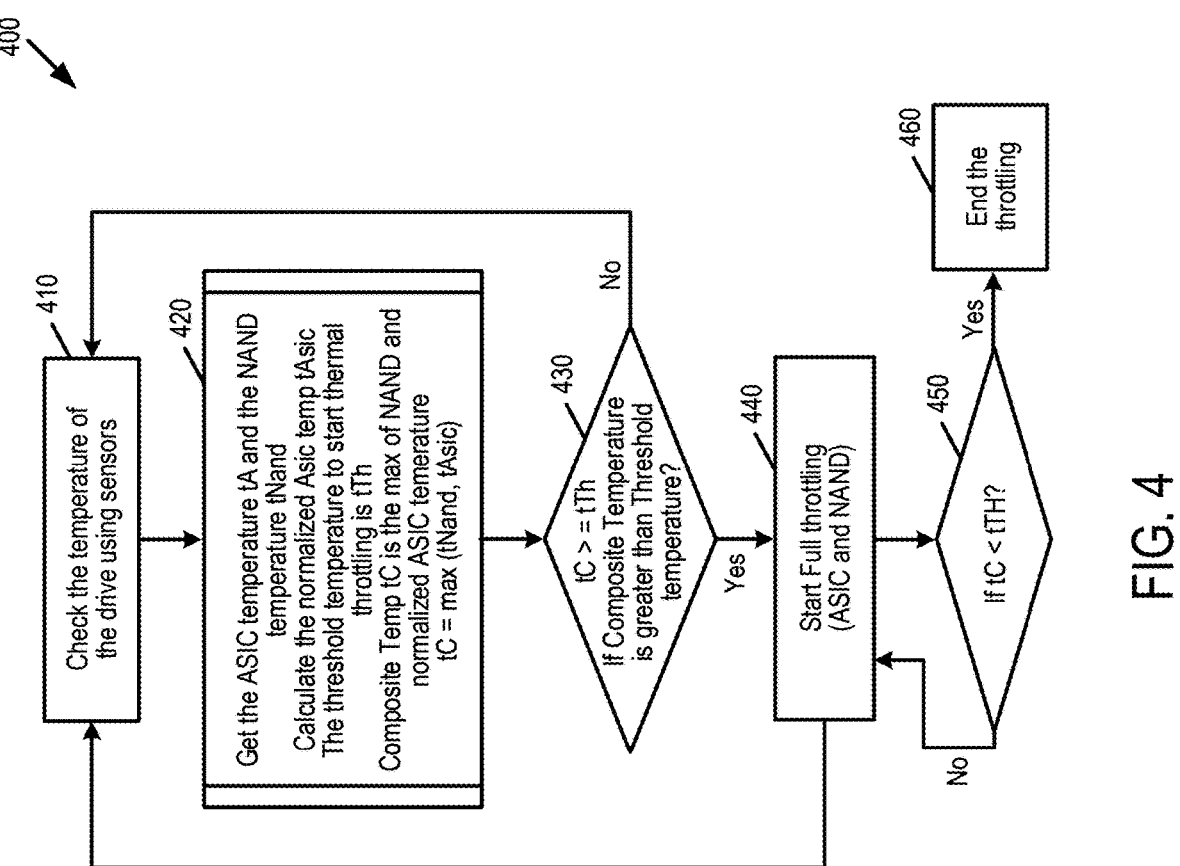

400

410
Check the temperature of the drive using sensors

420
Get the ASIC temperature tA and the NAND temperature tNand
Calculate the normalized Asic temp tAsic
The threshold temperature to start thermal throttling is tTh
Composite Temp tC is the max of NAND and normalized ASIC temerature
tC = max (tNand, tAsic)

430
tC > = tTh
If Composite Temperature is greater than Threshold temperature?

No

Yes

440
Start Full throttling (ASIC and NAND)

450
If tC < fTH?

No

Yes

460
End the throttling

FIG. 4

DATA STORAGE DEVICE AND METHOD FOR THERMAL MANAGEMENT THROUGH COMMAND SELECTION

BACKGROUND

Usage of the memory and controller in a data storage device can contribute to a rise in temperature of the data storage device. Thermal throttling techniques can be used to limit the number of operations performed in the data storage device when a composite temperature of the memory and the controller increases above a threshold.

BRIEF DESCRIPTION OF THE DRAWINGS

FIG. 4 is a flow chart of a method of an embodiment for performing thermal throttling.

DETAILED DESCRIPTION

Figures 1A, 1B, 1C:
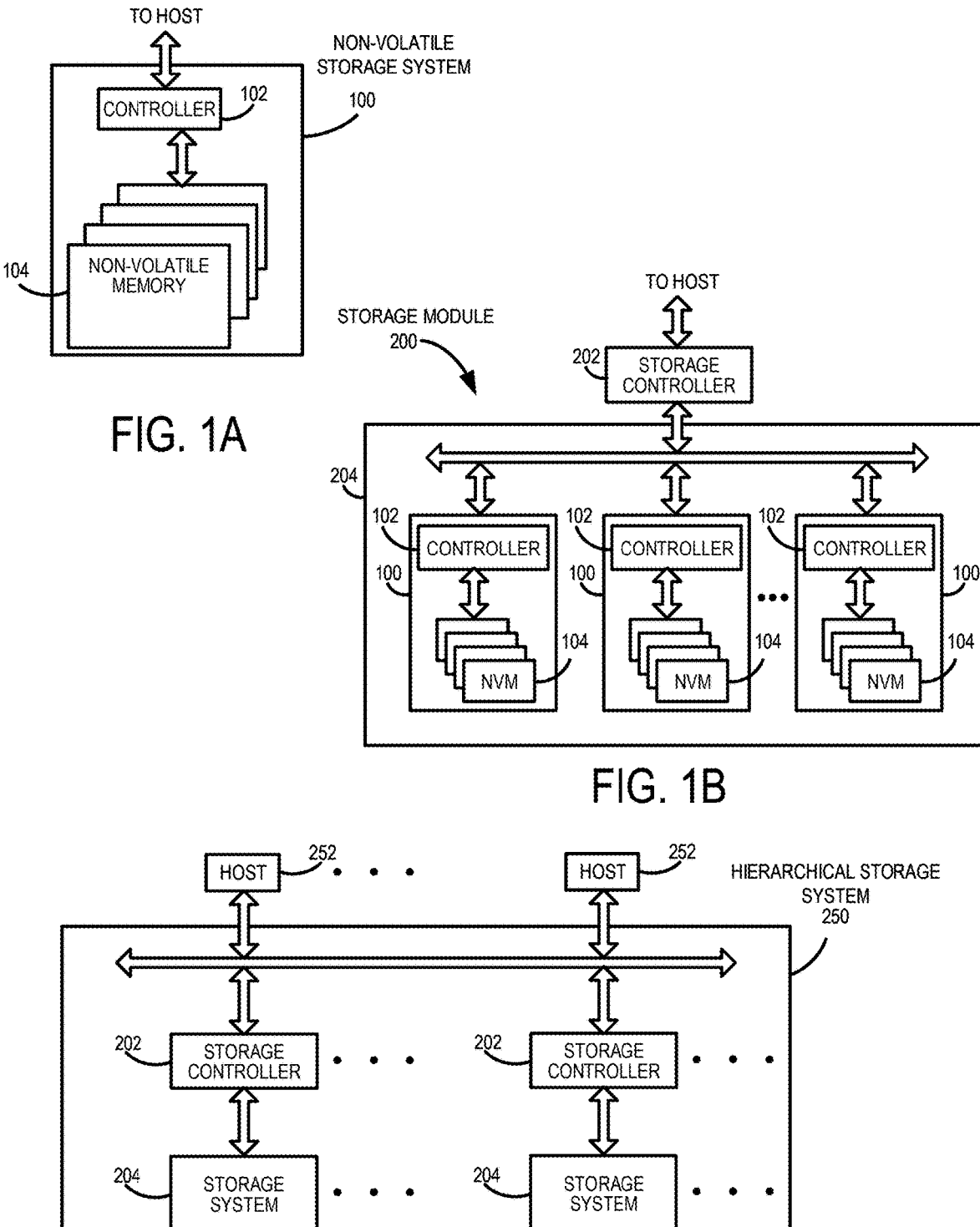
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for thermal management through command selection. In one embodiment, a data storage device is provided comprising a memory and one or more processors. The one or more processors, individually or in combination, are configured to: determine whether a temperature of the memory and/or a temperature of the one or more processors is above a threshold temperature; in response to determining that only the temperature of the memory is above the threshold temperature, execute a command whose execution uses relatively-more involvement of the one or more processors and relatively-less involvement of the memory; and in response to determining that only the temperature of the one or more processors is above the threshold temperature, execute a command whose execution uses relatively-more involvement of the memory and relatively-less involvement of the one or more processors.

In some embodiments, the one or more processors, individually or in combination, are further configured to perform full-device throttling in response to both the temperature of the memory and the temperature of the one or more processors being above the threshold temperature.

In some embodiments, the one or more processors, individually or in combination, are further configured to perform a command without throttling in response to a size of the command being below a threshold.

In some embodiments, the one or more processors, individually or in combination, are further configured to use a thermal credit point system to manage thermal throttling.

In some embodiments, the one or more processors, individually or in combination, are further configured to use a feedback loop to determine a temperature delta when a command selection policy changes and impacts an overall temperature curve of the data storage device.

In some embodiments, the one or more processors are part of a controller, and the one or more processors, individually or in combination, are further configured to reduce a temperature of the controller by disabling one or more hardware components of the controller.

In some embodiments, the one or more hardware components of the controller comprise: a hardware-aggregate write accumulator, a global access table search engine, a dedicated controller to interact with a host memory buffer/controller, and a hardware accelerator.

In some embodiments, the one or more processors are part of a controller, and the one or more processors, individually or in combination, are further configured to reduce a temperature of the controller by performing at least one of the following: reducing load on the controller by limiting a queue depth, reducing a frequency of the controller, modifying a flash interface module (FIM) toggle mode of the controller, or performing a memory trim.

In some embodiments, the one or more processors are further configured to order memory commands in a sequence according to their physical locations in the memory.

In some embodiments, the memory comprises a plurality of memory dies, and the one or more processors are further configured to determine a most-impacted memory die and select commands that minimize a workload on the most-impacted memory die.

In some embodiments, the command whose execution uses relatively-more involvement of the memory and relatively-less involvement of the one or more processors comprises a sequential command.

In some embodiments, the data storage device comprises a solid-state drive.

In some embodiments, the memory comprises a three-dimensional memory.

In another embodiment, a method is provided that is performed in a data storage device comprising a memory and a controller. The method comprises: determining that one, but not both, of the memory and the controller has a temperature that is above a thermal throttling threshold temperature; dynamically selecting a command from a submission queue that minimizes involvement of whichever one of the memory and the controller that has a temperature that is about the thermal throttling threshold temperature; and performing the command.

In some embodiments, the method further comprises using a thermal credit point system to manage thermal throttling.

In some embodiments, the method further comprises reducing a temperature of the controller by disabling one or more hardware components of the controller.

In some embodiments, the one or more hardware components of the controller comprise: a hardware-aggregate write accumulator, a global access table search engine, a dedicated controller to interact with a host memory buffer/controller, and a hardware accelerator.

In some embodiments, the method further comprises reducing a temperature of the controller by performing at least one of the following: reducing load on the controller by limiting a queue depth, reducing a frequency of the controller, modifying a flash interface module (FIM) toggle mode of the controller, or performing a memory trim.

In some embodiments, the method further comprises using temperature sensors to determine temperatures of the memory and controller.

In another embodiment, a data storage device is provided comprising: a memory; and means for a selecting command for execution by determining a thermal impact the command will have on an individual components in the data storage device rather than on a composite temperature of the data storage device.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
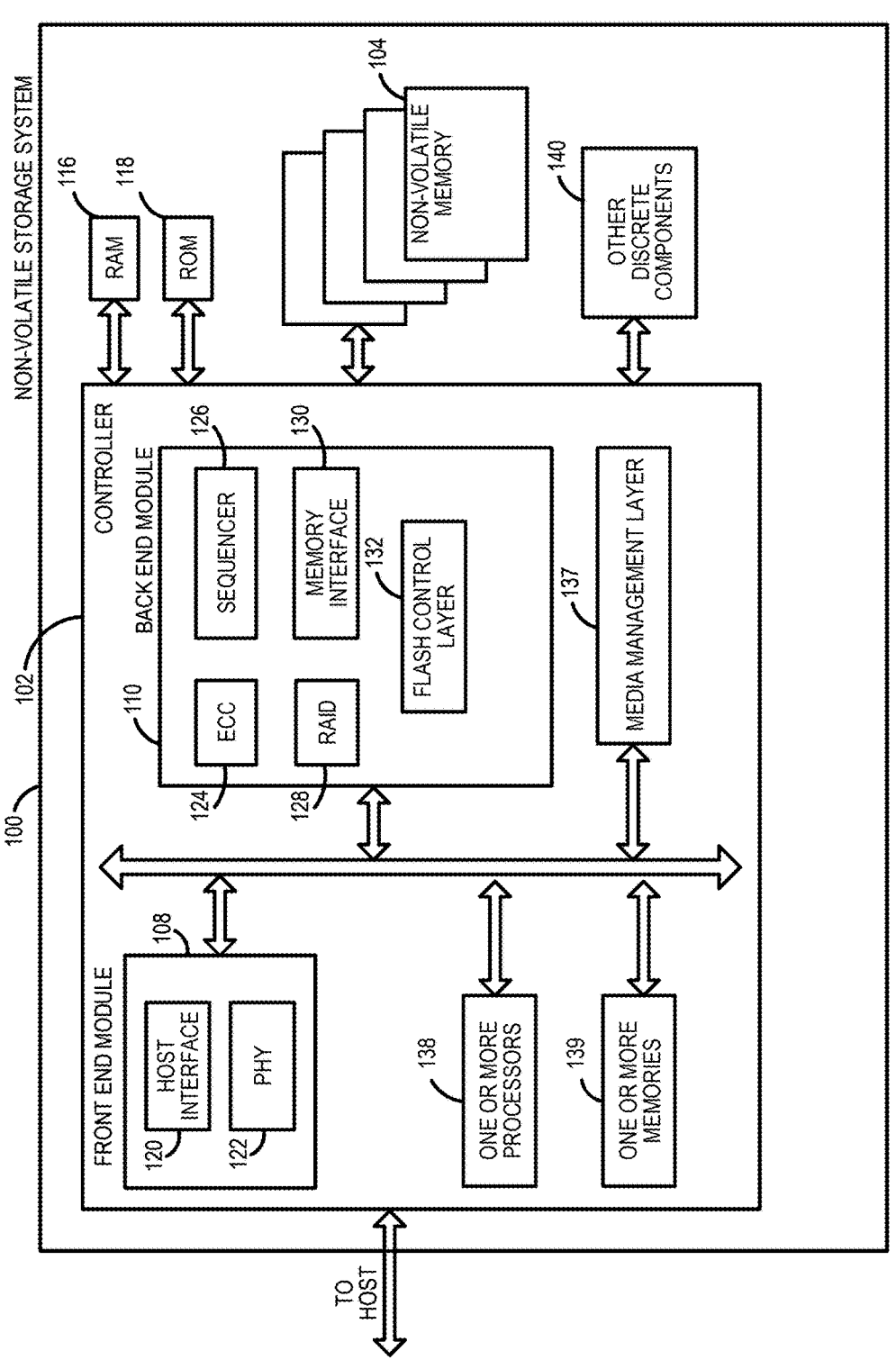
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component inter-connect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
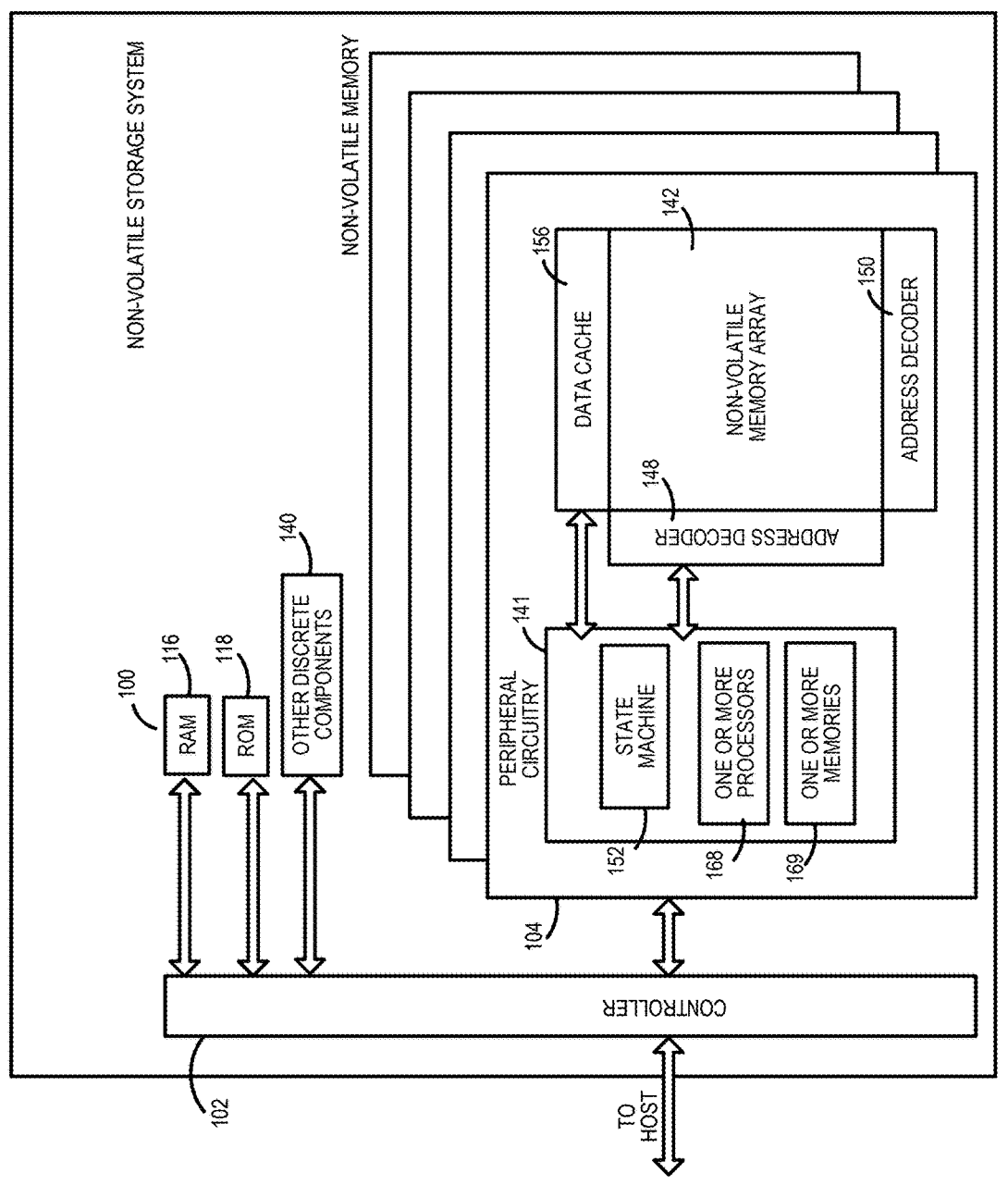
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
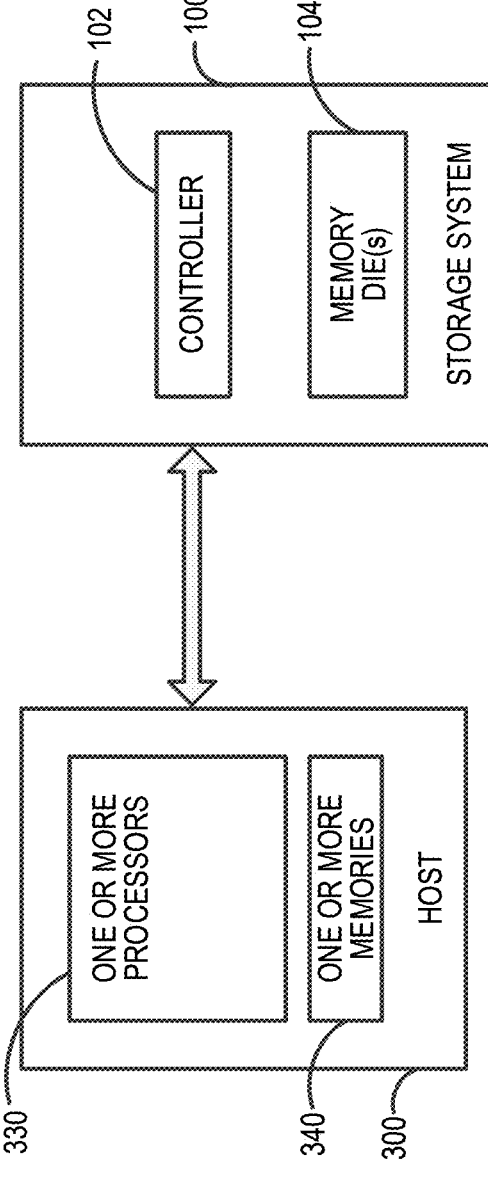
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In one embodiment, the host 300 operates under the Non-Volatile Memory Express (NVMe) specification and comprises a plurality of submission queues (SQs) and completion queues (CQs). Commands are placed by host software into a submission queue, and completions are placed into an associated completion queue by the controller 102 of the data storage device 100. In operation, the host 300 writes a command to the submission queue and then writes to a submission queue doorbell register in the data storage device 100 to alert the data storage device 100 to the fact that the host 300 has queued a command in the submission queue. Once alerted, the controller 102 of the data storage device 100 fetches and executes the command from the submission queue.

Memory operations (e.g., read/write/erase operations) and controller operations (e.g., computational operations) can contribute to a rise in temperature of the data storage device. A data storage device 100 may need to operate in a certain temperature range, and a thermal throttling mechanism can be used to cool down the data storage device's temperature by limiting the number of commands/actions that the controller 102 and memory 104 perform. Such actions can include, but are not limited to, disabling one or more hardware components, reducing load on an application-specific integrated circuit (ASIC) (e.g., the controller) by limiting the queue depth, reducing ASIC frequency, modifying flash interface module (FIM) toggle mode, or performing memory trim.

Thermal throttling actions can decrease the performance of the data storage device. To mitigate this problem, a composite temperature of the data storage device can be determined to decide when to enter thermal throttling mode. These actions can be performed at multiple levels as well as when different thresholds hit. An example is shown in the flow chart 400 of FIG. 4. In this method, the controller of the data storage device can check the temperature of the data storage device (drive) using sensors (410). The controller/ ASIC and memory temperature can be obtained (420), and certain derivations and calculations can be made to determine when to enter throttling mode. For example, a composite temperature can be calculated, which is the maximum of current memory/NAND (tNand) and ASIC (tAsic) temperature (i.e., tC=max(tNand, tAsic)) at any point of time. This composite temperature tC can be compared against a threshold temperature tTh, which upon reaching, can trigger and end throttling (430, 440, 450, 460).

With this logic, if one of the component temperatures crosses tTH, throttling is triggered. However, there can be situations in which the ASIC, but not the NAND, reaches its threshold, or vice-versa. In such situation, both the ASIC and the NAND are throttled even though one of them does not have to be, which can hinder performance even further.

The following embodiments can address this issue by providing thermal throttling situation without impacting the reliability of the data storage device. In general, in these embodiments, the controller 102 of the data storage device 100 prioritizes a command in a submission queue (SQ) based on an individual thermal state of the memory 104 and controller 102 (ASIC components) in the data storage device 100. If the memory temperature is above a throttling temperature threshold, the controller 102 chooses a command from submission queue whose command execution needs less memory involvement (however, such command may need more controller involvement) compared to the competing commands in the submission queue. The controller 102 can have a command size cut off and actively execute those commands whose size is less than a threshold. The controller 102 continues in this state based on best effort, providing the components in the data storage device 100 (e.g., the memory 104 and the controller 102) more individual recovery time, while, at the same time, continuing to function. To accomplish this, the controller 102 can manage a thermal credit point at a component level during implementation.

In one example, the controller 102 prioritizes a set of sequential commands in the submission queue when it determines that the controller temperature is above an acceptable threshold, but when the memory temperature is within safe limits. This enables the data storage device 100 to continue functioning for more time than prior data storage devices at least for those workloads that do not have much dependency on the impacted resources. It should be noted that sequential workloads can result in large memory usage (e.g., across most/all memory dies and metaplanes) and, thereby, have a greater thermal effect. However, the overall controller impact, especially the impact on the flash translation layer (FTL), is less. It should also be noted the above is different from the general concept of command arbitration in data storage devices and specifically biasing host-selected commands, such as immediate execution of commands in urgent queues or administrative queues during thermal throttling. That is, these embodiments can bias commands according to how each of them impacts the thermal state at a component level. So, a command can be throttled only if the controller 102 determines that the specific associated component is in a critical path or if it is negatively biased against its peers, for example.

In another example, a compute solid-state drive (SSD) uses the thermal throttling mechanism described herein to bias compute execution commands in the compute queue based on whether the controller/ASIC, compute core, or the memory 104 is most impacted due to temperature in the data storage device 100. In this embodiment, the data storage device 100 performs thermal management by arbitrating compute commands to suit its component thermal state machine that also includes compute cores. The compute controller can execute compute-intensive operations using compute core/storage core when it determines that the temperature has risen due to the memory 104 and not due to the controller 102. On the other hand, the controller 102 can perform data-intensive compute operations (e.g., involving multiple memory transfers, but fewer computations) when it determines that the controller's temperature is the reason for composite thermal throttling. It should be noted that the general concept of having many sensors across the data storage device 100 to determine the region-wise temperature is different from these embodiments in that these embodiments can leverage such information to determine the impacted component and the physical proximity to determine the sequence of command selection.

These embodiments can also have a feedback loop that determines the temperature delta when the command selection policies change and impact the overall device temperature curve owing to different usage of memory and controller/ASIC components for each of the commands. A credit point system can be used to identify the impact of a command on a specific hardware component, and that information can be used to determine the selection policy. The controller 102 can also use the information to decide whether to continue the chosen path or to enter a full thermal throttling mode, which can operate using known throttling mechanisms.

Additionally, the controller 102 can order the memory commands in a sequence according to their physical locations. For example, if Die 0, 1, 2, 3 are in physical proximity, Die 4, 5, 6, 7 are in another physical proximity, and Die 8, 9, 10, 11 are in yet another physical proximity, the controller 102 can choose and execute commands such that only one or few dies are operational in a physical proximity region at any point in time. Likewise, the controller 102 can determine the most-impacted dies in the data storage device 100 and perform storage input-output or compute operations in a fashion to keep the least workload (e.g., trade off with quality of service) in impacted physical proximity regions.

Referring back to the flow chart 400 of FIG. 4, in this approach, a data storage device undergoes full throttling whenever one of its components crosses a threshold temperature. In contrast, in this embodiment, the controller 102 dynamically chooses appropriate commands (e.g., storage and/or compute commands) such that only the components that contributed to a rise in temperature of the data storage device 100 are not used or least used, and the rest of the components are kept in operating condition. Thereby, these embodiments avoid a full-throttle condition and, instead, provide a controlled way of throttling, as need.

Generally, to process a command/set of commands, both the controller 102 and the memory 104 are involved. However, depending on the type of incoming workload, the controller 102 can be aware if the operations involved demand more tasks that involves the controller 102 or the memory 104. The controller 102 can use a credit point-based system to determine what command impacts what hardware and by what amount. For example, the controller 102 can use the following example hardware components: a hardware-aggregate write accumulator (HAWA) for write requests, a global access table search engine (GDSE) for random reads, a dedicated controller to interact with a host memory buffer/controller (HMB/HMBC), and a hardware accelerator (HA) to classify the incoming commands as sequential or random. The operations performed in these hardware components can result in a rise of temperature and power consumption of the data storage device 100. Not all of these hardware components may be required to be operational all the time, and their usage can be dependent on the type of workload. Also, statistics of power consumption and heat dissipated from each hardware component can be obtained for every workload. This information can let the controller 102 decide to dynamically choose and switch on/off the impacted components on a temperature shoot. Similarly, depending on each die temperature, the controller 102 can choose to perform operations on specific memory dies whose temperature is well within limits.

Consider a scenario where the host 300 is bombarding the data storage device 100 with sequential workloads for a long time, which involves a lot of data transfer operations in the memory 104, resulting in the memory 104 reaching its threshold temperature. However, in this scenario, involvement of ASIC components may be minimal, leaving the temperature of ASIC way below the threshold temperature. If the method in FIG. 4 is used, full throttling of the data storage device would take place if one of the components crosses the threshold temperature even though there is ample room for the ASIC to continue its operations without involving NAND at all. Similarly, random workloads can involve more computations/calculations in the controller 102 than in the memory 104. In such situations, the controller 102 can prioritize such workloads to the memory 104 while the controller 102 throttles. The controller 102 can be made aware of all such commands and the operations involved to smartly route the tasks to the non-impacted resources while throttling the impacted one. This way, the data storage device 100 can function better by performing independent tasks while maintaining the data storage device's temperature under control. Further, as an extension to this, controller hardware that is not involved in the workload can be switched off, such that only the required hardware is retained to provide faster cooling of the data storage device 100.

Figure 5:
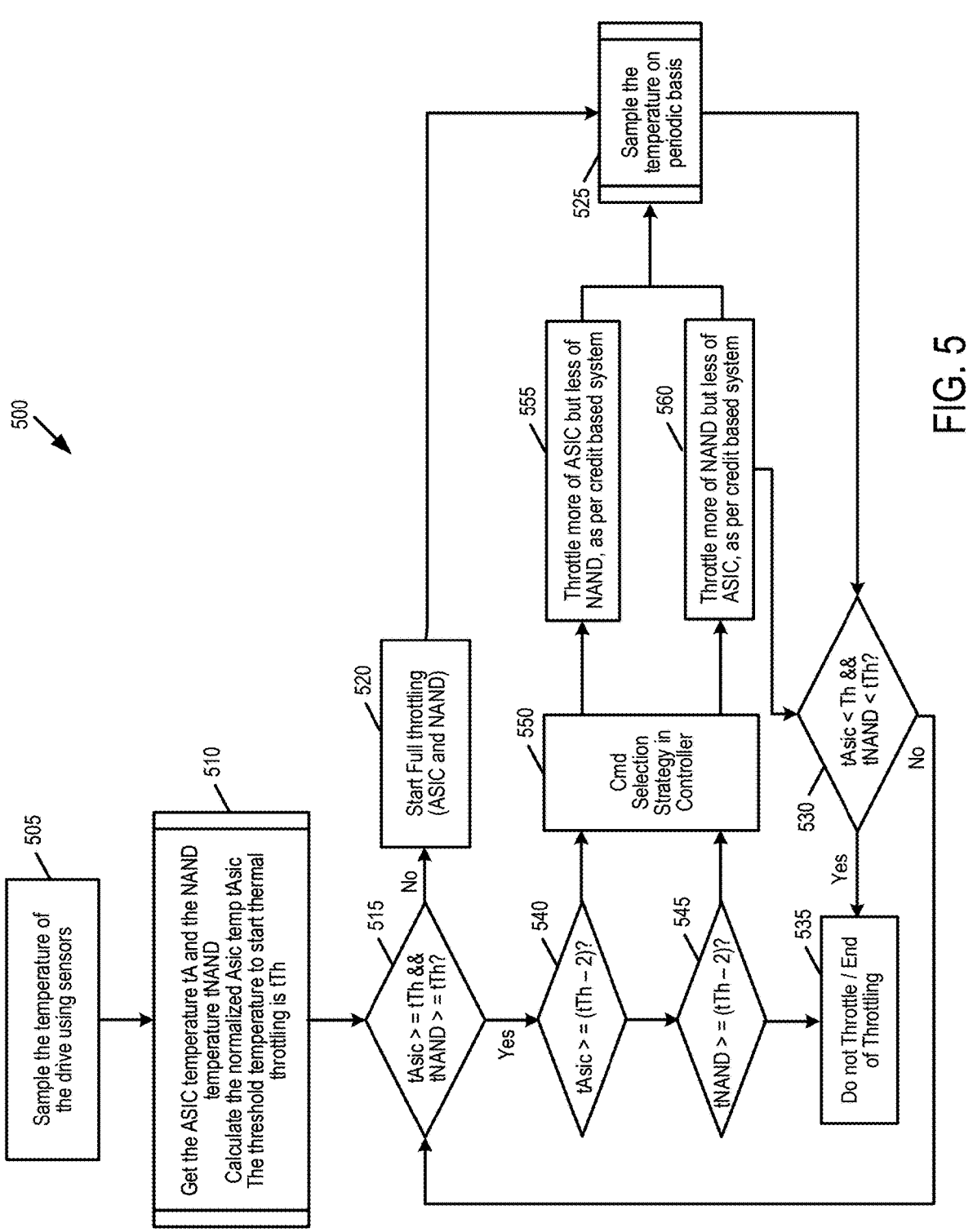
FIG. 5 is a flow chart of a method of an embodiment for thermal management through command selection.

In one embodiment, the thermal throttling occurs in response to the temperature of the components nearing a threshold tTh, say at (tTh-2) temperature itself, which allows the controller 102 to apply command selection policies across the controller 102 and the memory 104 at the same time, letting the impacted resources cool down in parallel. FIG. 5 is a flow chart 500 that illustrates this. In this flow chart 500, acts 505, 510, 520, 525, 530, and 535 are similar to those described above in the flow chart 400 in FIG. 4. Acts 515, 540, 545, 550, 555, and 560 represent the different in handing the state prior to throttling.

Figure 6:
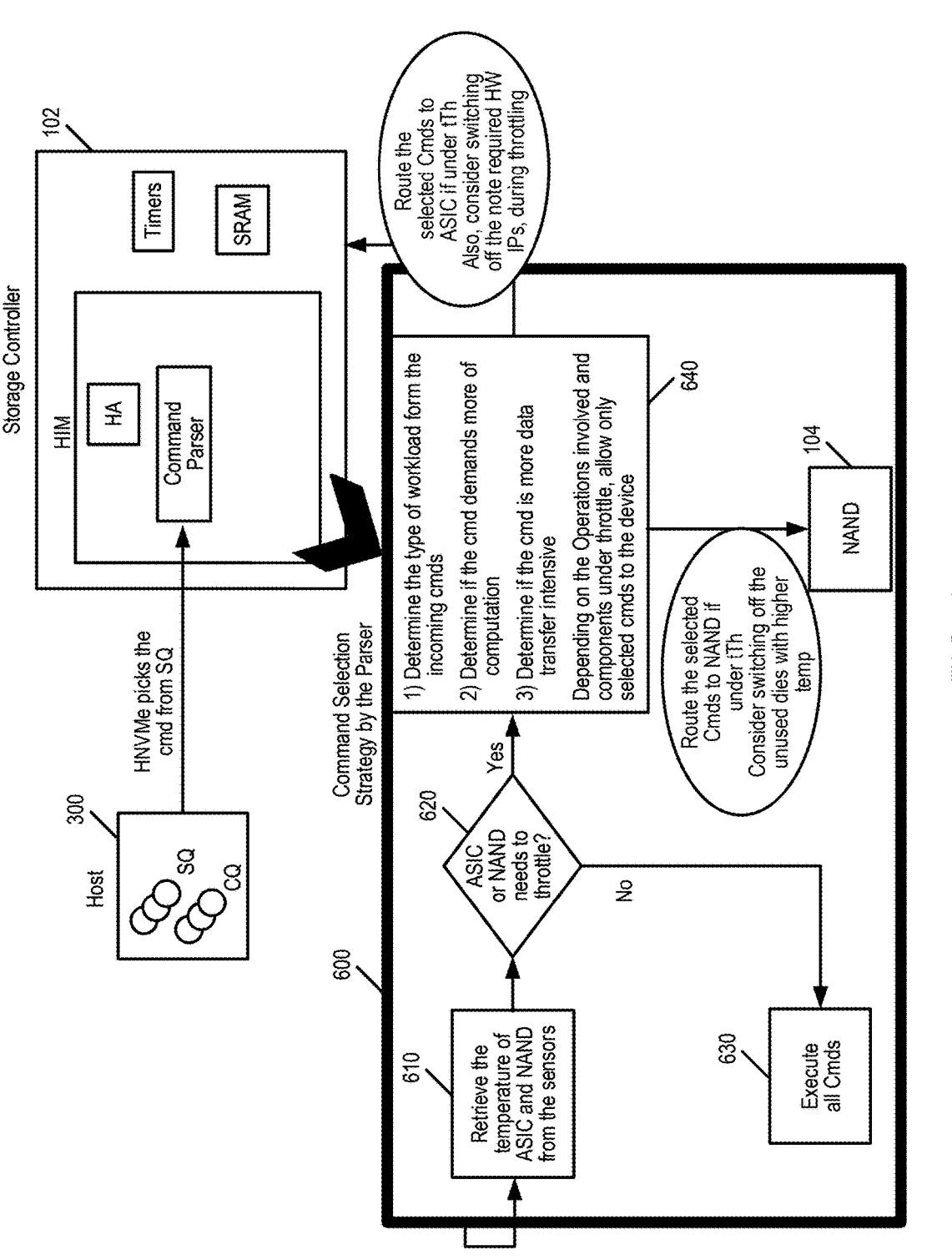
FIG. 6 is an illustration of a thermal-state-based command selection strategy of an embodiment.

Further, FIG. 6 is an illustration of an example thermal-state-based command selection strategy. In this example, the controller 102 comprises a host interface module (comprising a hardware accelerator and a command parser), timers, and SRAM. The controller 102 can have additional components, such as, but not limited to, a hardware-aggregate write-accelerator (HAWA), HNVMe module that is responsible for picking a command from a submission queue, and a global access table search engine (GDSE), as discussed above. In this example, the command parser is configured to incorporate a strategy to route commands to non-impacted resources depending on the individual thermal state of the components in the data storage device 100. A credit-point-based system can be used to help to identify the kind of resources required for each command/workload to make these strategies simpler.

As illustrated in the flow chart 600 in FIG. 6, in this example strategy, the controller 102 retrieves the temperature of the controller (ASIC) 102 and memory (NAND) 104 from temperature sensors (610). The controller 102 then determines whether the controller 102 or the memory 104 needs to be throttled (620). If neither needs to be throttled because the temperature is below a threshold temperature, the controller 102 executes all commands (630). However, if throttling is needed because the temperature is above the threshold temperature, the controller 102 determines the type of workload from the incoming commands and also determines if a command is more computationally demanding or more data transfer intensive (640). The controller 102 then routes the selected commands to the controller 102 or the memory 104 accordingly.

Figure 7:
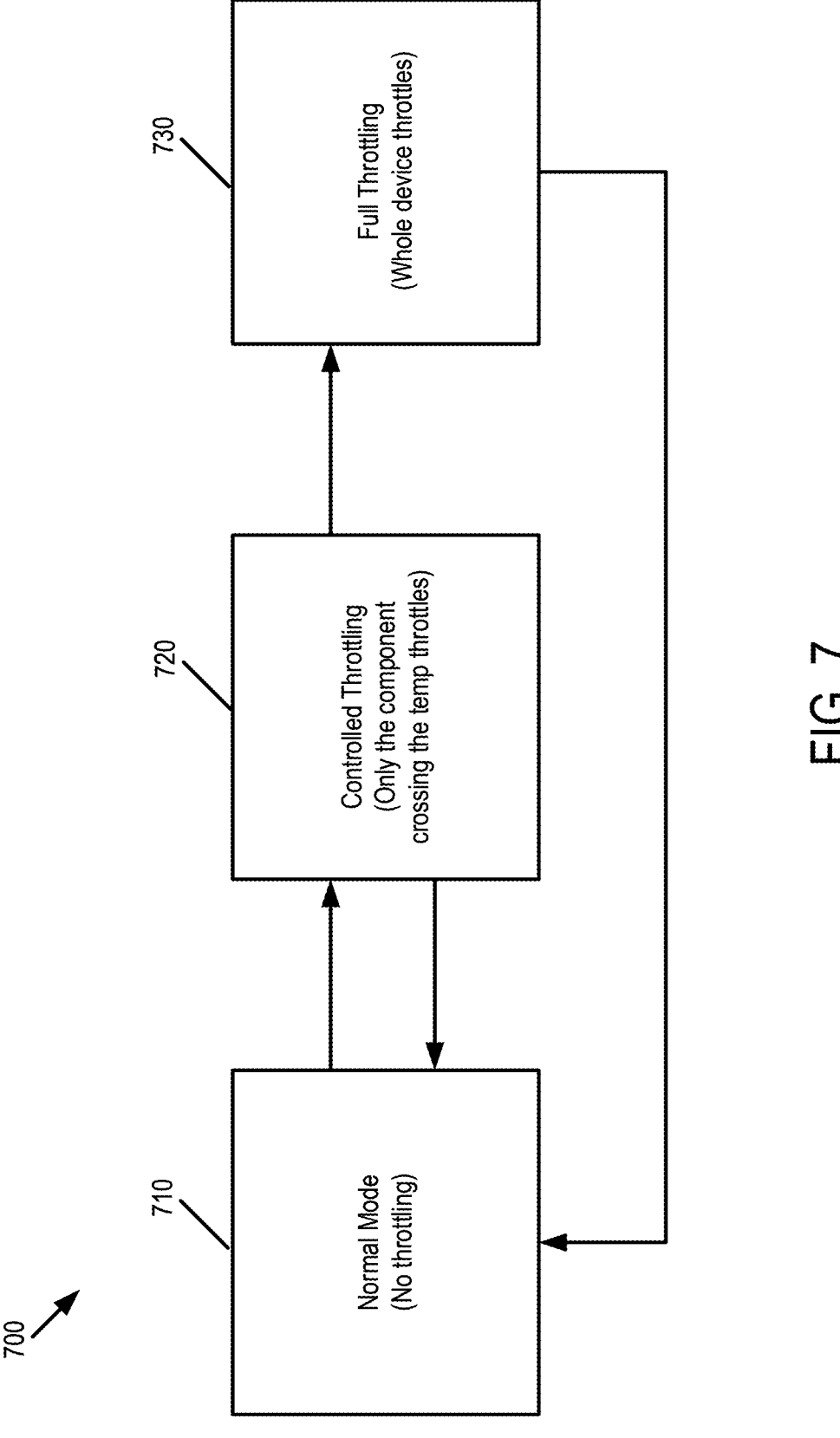
FIG. 7 is a state diagram of an embodiment.

With this mechanism in place, the computations in ASIC 102 (independent of NAND 104) can still go through if the NAND 104 temperature hits the threshold. Similarly, data transfers in the NAND 102 are uninterrupted if the ASIC 102 is throttling. This approach can result in improvement in performance of the data storage device 100. Meanwhile, thermal sensors sense the temperatures on a periodic manner. If certain conditions are met, the data storage device 100 can go to full throttling or normal running mode. So, as illustrated in FIG. 7, there are three states in this example: normal mode 710, component (e.g., controller or memory) throttling mode 720, and full throttling mode 730.

There are several advantages associated with these embodiments. For example, these embodiments can be used to solve the lower-performance problem that occurs with typical thermal throttling. Also, these embodiments may be especially beneficial in solid-state drives (SSDs) in the compute segment since these embodiments allows the drive to perform some compute functions even when the memory is throttling.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory comprising a plurality of memory dies, wherein the plurality of memory dies comprises a plurality of subsets of memory dies in sequential physical locations; and
one or more processors, individually or in combination, configured to:
determine that first and second commands are in a queue, wherein executing the first command uses relatively-more involvement of the one or more processors and relatively-less involvement of the memory, and wherein executing the second command uses relatively-more involvement of the memory and relatively-less involvement of the one or more processors;
determine whether a first temperature of the memory and/or a second temperature of the one or more processors is above a threshold temperature;
in response to determining that only the first temperature of the memory is above the threshold temperature:
retrieve the first command, but not the second command, from the queue;
execute the first command; and retrieve the second command from the queue only after the first temperature of the memory is no longer above the threshold temperature; and
in response to determining that only the second temperature of the one or more processors is above the threshold temperature:
retrieve the second command, but not the first command, and at least one additional command that uses relatively-more involvement of the memory and relatively-less involvement of the one or more processors from the queue;
execute the second command and the at least one additional command in a sequence such that some, but not all, memory dies in each subset are operational, and wherein the memory dies that are operational are within a temperature limit; and
retrieve the first command from the queue only after the second temperature of the one or more processors is no longer above the threshold temperature.

2. The data storage device of claim 1, wherein the one or more processors, individually or in combination, are further configured to perform full-device throttling in response to both the first temperature of the memory and the second temperature of the one or more processors being above the threshold temperature.

3. The data storage device of claim 1, wherein the one or more processors, individually or in combination, are further configured to perform a third command without throttling in response to a size of the third command being below a threshold.

4. The data storage device of claim 1, wherein the one or more processors, individually or in combination, are further configured to use a thermal credit point system to manage thermal throttling.

5. The data storage device of claim 1, wherein the one or more processors, individually or in combination, are further configured to use a feedback loop to determine a temperature delta when a command selection policy changes and impacts an overall temperature curve of the data storage device.

6. The data storage device of claim 1, wherein the one or more processors are part of a controller, and the one or more processors, individually or in combination, are further configured to reduce a third temperature of the controller by disabling one or more hardware components of the controller.

7. The data storage device of claim 6, wherein the one or more hardware components of the controller comprise: a hardware-aggregate write accumulator, a global access table search engine, a dedicated controller to interact with a host memory buffer/controller, and a hardware accelerator.

8. The data storage device of claim 1, wherein the one or more processors are part of a controller, and the one or more processors, individually or in combination, are further configured to reduce a third temperature of the controller by performing at least one of the following: reducing load on the controller by limiting a depth of the queue, reducing a frequency of the controller, modifying a flash interface module (FIM) toggle mode of the controller, or performing a memory trim.

9. The data storage device of claim 1, wherein the one or more processors, individually or in combination, are further configured to determine a most-impacted memory die and select commands that reduce a workload on the most-impacted memory die.

10. The data storage device of claim 1, wherein the command whose execution uses relatively-more involvement of the memory and relatively-less involvement of the one or more processors comprises a sequential command.

11. The data storage device of claim 1, wherein the data storage device comprises a solid-state drive.

12. The data storage device of claim 1, wherein the memory comprises a three-dimensional memory.

13. A method comprising:

performing in a data storage device comprising a memory and a controller, wherein the memory comprising a plurality of memory dies and wherein the plurality of memory dies comprises a plurality of subsets of memory dies in sequential physical locations:

determining that first and second commands are in a submission queue, wherein executing the first command uses relatively-more involvement of the controller and relatively-less involvement of the memory, and wherein executing the second command uses relatively-more involvement of the memory and relatively-less involvement of the controller;

determining that one, but not both, of a first temperature the memory and a second temperature of the controller is above a thermal throttling threshold temperature;

in response to determining that only the first temperature of the memory is above the thermal throttling threshold temperature:

retrieving the first command, but not the second command, from the submission queue;

executing the first command; and retrieving the second command from the submission queue only after the first temperature of the memory is no longer above the thermal throttling threshold temperature; and in response to determining that only the second temperature of the controller is above the thermal throttling threshold temperature:

retrieving the second command, but not the first command, and at least one additional command that uses relatively-more involvement of the memory and relatively-less involvement of the controller from the submission queue;

executing the second command and the at least one additional command in a sequence such that some, but not all, memory dies in each subset are operational, and wherein the memory dies that are operational are within a temperature limit; and retrieving the first command from the submission queue only after the second temperature of the controller is no longer above the thermal throttling threshold temperature.

14. The method of claim 13, further comprising using a thermal credit point system to manage thermal throttling.

15. The method of claim 13, further comprising reducing the second temperature of the controller by disabling one or more hardware components of the controller.

16. The method of claim 15, wherein the one or more hardware components of the controller comprise: a hardware-aggregate write accumulator, a global access table search engine, a dedicated controller to interact with a host memory buffer/controller, and a hardware accelerator.

17. The method of claim 13, further comprising reducing the second temperature of the controller by performing at least one of the following: reducing load on the controller by limiting a depth of the submission queue, reducing a frequency of the controller, modifying a flash interface module (FIM) toggle mode of the controller, or performing a memory trim.

18. The method of claim 13, further comprising using temperature sensors to determine the first temperature of the memory and the second temperature of the controller.

19. A data storage device comprising:

a memory comprising a plurality of memory dies wherein the plurality of memory dies comprises a plurality of subsets of memory dies in sequential physical locations;

one or more processors; and means for:

determining that first and second commands are in a queue, wherein executing the first command uses relatively-more involvement of the one or more processors and relatively-less involvement of the memory, and wherein executing the second command uses relatively-more involvement of the memory and relatively-less involvement of the one or more processors;

determining whether a first temperature of the memory and/or a second temperature of the one or more processors is above a threshold temperature;

in response to determining that only the first temperature of the memory is above the threshold temperature:

retrieving the first command, but not the second command, from the queue;

executing the first command; and retrieving the second command from the queue only after the first temperature of the memory is no longer above the threshold temperature; and in response to determining that only the second temperature of the one or more processors is above the threshold temperature:

retrieving the second command, but not the first command, and at least one additional command that uses relatively-more involvement of the memory and relatively-less involvement of the one or more processors from the queue;

executing the second command and the at least one additional command in a sequence such that some, but not all, memory dies in each subset are operational, and wherein the memory dies that are operational are within a temperature limit; and retrieving the first command from the queue only after the second temperature of the one or more processors is no longer above the threshold temperature.

* * * * *